US008607250B2

(12) United States Patent
Oral et al.

(10) Patent No.: US 8,607,250 B2
(45) Date of Patent: Dec. 10, 2013

(54) VISUALLY INDICATING A CALENDAR EVENT AMONG DIFFERENT TIME ZONES

(75) Inventors: Tolga Oral, Winchester, MA (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 1349 days.

(21) Appl. No.: 11/855,446

(22) Filed: Sep. 14, 2007

(65) Prior Publication Data

US 2009/0077570 A1    Mar. 19, 2009

(51) Int. Cl.
G06F 3/00 (2006.01)
G06F 3/048 (2013.01)
G06Q 10/00 (2012.01)

(52) U.S. Cl.
USPC .......................... 719/318; 705/7.13; 715/963

(58) Field of Classification Search
USPC .......................... 705/7.13; 715/963; 719/318
See application file for complete search history.

(56) References Cited

U.S. PATENT DOCUMENTS

| 4,819,191 | A | 4/1989 | Scully et al. |
| 6,295,541 | B1 | 9/2001 | Bodnar et al. |
| 6,370,566 | B2 | 4/2002 | Discolo et al. |
| 7,174,517 | B2 * | 2/2007 | Barnett et al. ................. 715/764 |
| 7,711,855 | B2 * | 5/2010 | Thind et al. .................... 709/246 |
| 7,856,483 | B2 * | 12/2010 | Fitzpatrick et al. ........... 709/216 |
| 2003/0005056 | A1 * | 1/2003 | Yamamoto et al. ........... 709/205 |
| 2006/0241998 | A1 * | 10/2006 | Rokosz et al. .................... 705/9 |
| 2007/0186193 | A1 * | 8/2007 | Curran .......................... 715/968 |
| 2008/0153474 | A1 * | 6/2008 | Scott ............................. 455/418 |

OTHER PUBLICATIONS

Palen, Social, Individual & Technological Issues for Groupware Calendar Systems, CHI '99, Pittsburgh, PA, ACM (May 15-20, 1999).
Otala, "Using the pocket outlook object model", Windows Developers Journal, vol. 11, No. 11, pp. 8-25, Miller Freeman (Nov. 2000). Abstract only.
Bry, "CaTTS: Calendar Types and Constraints for Web Applications", WWW 2005, Chiba, Japan, ACM (May 10-14, 2005).
Brzozowski, "groupTime: Preference-Based Group Scheduling", CHI 2006 Proceedings, Montreal, Quebec, Canada, ACM (Apr. 22-27, 2006).

* cited by examiner

*Primary Examiner* — Charles E Anya
(74) *Attorney, Agent, or Firm* — Cuenot, Forsythe & Kim, LLC

(57) ABSTRACT

A calendared event may be visually indicated. A proposed time for the calendared event can be identified and each of a plurality of event participants can be associated with the calendared event. For each of the participants, a local time of the participant that corresponds to the proposed time for the calendared event can be identified and displayed.

17 Claims, 3 Drawing Sheets

VISUALLY INDICATING A CALENDAR EVENT AMONG DIFFERENT TIME ZONES

BACKGROUND OF THE INVENTION

With the growth of the Internet and the use of personal computers in the workplace, electronic calendaring tools have become popular business resources, especially in large corporations. With a calendaring tool, a first user scheduling a calendar event (i.e. event coordinator) can send invitation messages inviting other calendar tool users (i.e. invitees) to participate in the event at a proposed time. Each of the invitees then can accept or decline the invitation message, or reply to the message with a request, a comment, or an invitation for a new proposed time.

Oftentimes the event coordinator and invitees are distributed across different time zones. When the event coordinator tries to schedule the calendar event, it can be very difficult for the event coordinator to visually understand the time differences. Indeed, in some cases, a scheduler display may show colors indicating availability of users, but may not display time zone differences. Consequently, the event coordinator may not be aware of the time zone differences, and may schedule events at times that are inconvenient for one or more of the invitees. Similarly, invitees may propose new times that are inconvenient for the event coordinator or other invitees.

BRIEF SUMMARY OF THE INVENTION

The present invention relates to a method and a system for calendaring events. One embodiment of the present invention can include a method for visually indicating a calendared event. The method can include identifying a proposed time for the calendared event, associating each of a plurality of event participants with the calendared event, and, for each of the participants, identifying a local time of the participant that corresponds to the proposed time for the calendared event and displaying the local time. Further, for at least a first of the participants, a first indicator of a difference between the first participant's local time and an event time reference can be displayed.

Another embodiment of the present invention can include a method for visually indicating a calendared event. The method can include identifying a proposed time for the calendared event, associating each of a plurality of event participants with the calendared event, and, for each of the participants, identifying a local time of the participant that corresponds to the proposed time for the calendared event and displaying the local time. The method further can include, for each of the participants, identifying a local time of the participant that corresponds to the proposed time for the calendared event, and displaying a first indicator that indicates the local time of each of the participants.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
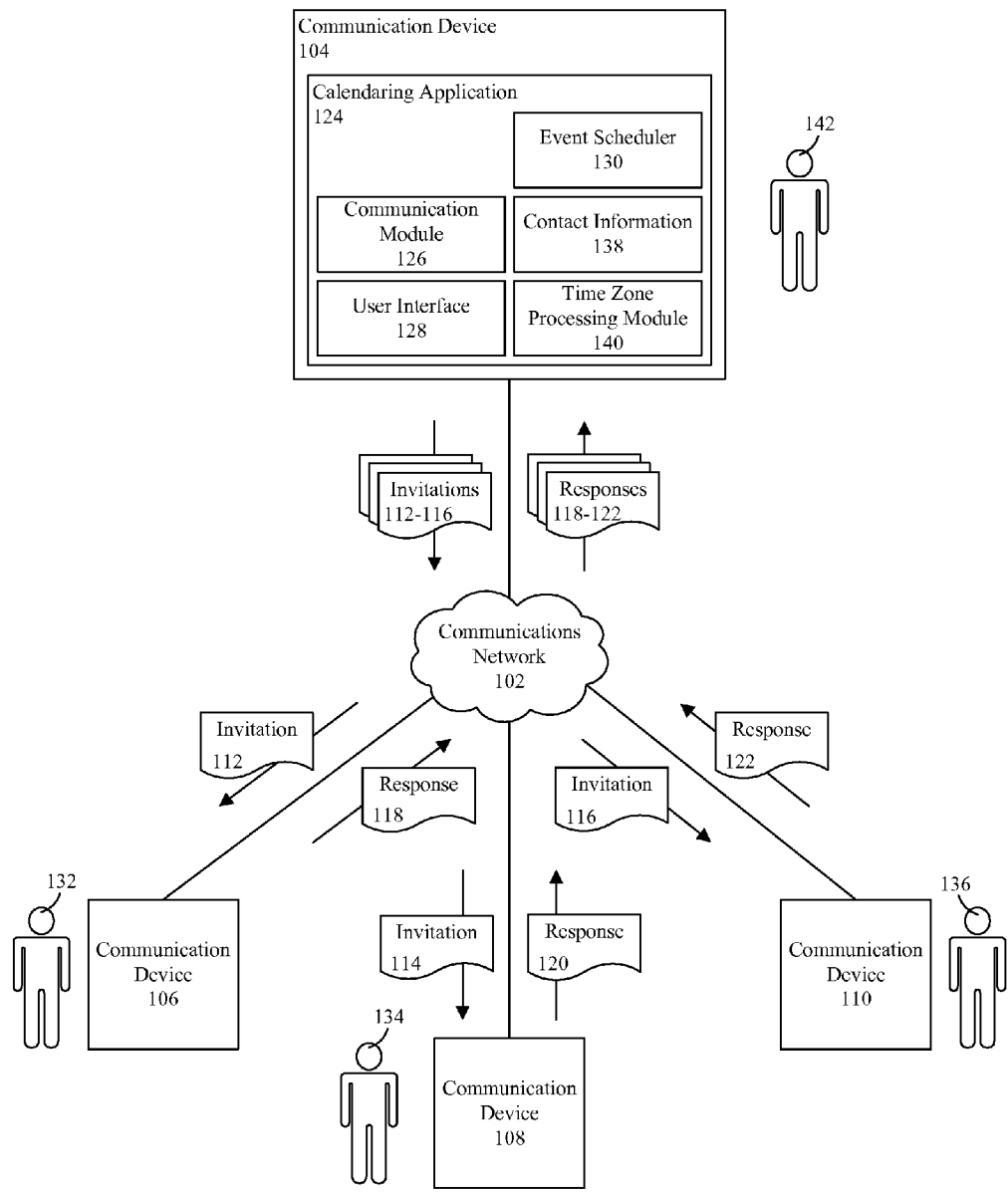
FIG. 1 is a block diagram illustrating a system for indicating a calendared event in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention relates to a method and a system for calendaring events in which one or more event participants may be located in different time zones. The system can automatically identify time zone differences, and present the events in a calendar view that indicates such differences. Further, the system can indicate times which, to certain event participants, may be inconvenient for event scheduling.

FIG. 1 is a block diagram illustrating a system 100 for indicating a calendared event in accordance with one embodiment of the present invention. The communications system 100 can include a communications network 102, which may comprise any suitable network infrastructure, for example a wide area network (WAN), such as the Internet, the World Wide Web, a cellular communications network, a public switched telephone network (PSTN), and the like. Other examples of suitable network infrastructure may include, but are not limited to, a radio access network (RAN), a local area network (LAN), a metropolitan area network (MAN), a WiFi network and/or a Mesh network. In that regard, the communications network 102 can include wired and/or wireless communication links and can be implemented in accordance with any suitable communications standards, protocols, and/ or architectures, or a suitable combination of such standards, protocols, and/or architectures.

The communications system 100 also can include one or more communication devices 104, 106, 108, 110 which communicate event invitations 112, 114, 116 and responses 118, 120, 122 via the communications network 102. The communication devices 104-110 can be, for instance, computers, mobile stations (e.g. mobile telephones, mobile radios, mobile computers, personal digital assistants, or the like), set top boxes, access terminals, subscriber stations, user equipment, or any other devices suitably configured to communicate via the communications network 102. As such, the communication devices 104-110 can comprise one or more processors, computer-usable mediums, network adapters, I/O devices, such as those previously described, and/or other suitable components.

The communication device 104 can include a calendaring application 124 that implements the methods and processes described herein. The calendaring application 124 can comprise a communication module 126 configured to send the event invitations 112-116 to the communication devices 106-110, and receive the responses 118-122 from such communication devices 106-110. For example, the communication module 126 can receive event information, encode the event information into a suitable message format (e.g. into one or more packets or frames), and communicate the messages in accordance with a suitable messaging protocol. In addition, the communication module 126 can receive the responses 118-122 in the form of messages and parse response information from such messages.

The calendaring application 124 also can include a user interface 128 for receiving user inputs and presenting information to a user of the communication device 104. Such information can include, for instance, one or more calendars, scheduled events, responses to invitation requests, and so on. In one embodiment, the user interface 128 can be a graphical user interface.

An event scheduler 130 also can be provided. The event scheduler 130 can receive user inputs via the user interface 128 to schedule events, communicate event invitation information to the communication module 126 to generate the event invitations 112-116, receive from the communication module 126 response information based on the responses 118-122, schedule events based on the event information and response information, and perform other event scheduling tasks.

The event invitation information generated by the event scheduler 130 can identify one or more contacts 132, 134, 136, identify respective time zone information for such contacts 132-136, and associate the contacts 132-136 and time zone information with an event. For example, the event scheduler 130 can interface with contact information 138 to retrieve information about contacts 132-136 to whom event invitations 112-116 are to be sent (e.g. via the communication devices 106-110). Such contacts 132-136 can be identified by user inputs received via the user interface 128. The user inputs can correspond to individual contacts 132-136 or contact groups (e.g. user groups).

The contact information 138 can include time zone indicators for the contacts 132-136. A time zone indicator for a particular contact 132-136 can include the contact's home time zone, the current time zone in which the contact is located, a time zone in which the contact 132-136 is anticipated to be located at a future time (e.g. when an event is to be scheduled), and/or any other time zones with which the contact 132-136 is otherwise associated. Hereinafter, any such time zones will be referred to as a "local time zone" of the contact 132-136. The time zones can be identified with respect to a world clock, Greenwich Mean Time (GMT), military time zones, Nato time zones, letter time zones, North American time zones, European time zones, Australian time zones, and/or any other suitable time zones.

The event scheduler 130 can interface with a time zone processing module 140 to convert an event time in a first time zone to corresponding times in one or more time zones with which the contacts 132-136 are associated. The first time zone can be a time zone in which a user 142 of the system 100 is located, a time zone in which the system 100 is located, a home time zone for the system 100 or a user 142 of the system 100, a time zone in which the system 100 or user 142 is anticipated to be located at a future time, and/or any other time zones with which the system 100 or the user 142 is otherwise associated. Hereinafter, any such time zones will be referred to as a "local time zone" of the user 142.

Each of the event invitations 112-116 can identify the event and the proposed time for the event in the contact's local time zone. For example, assume that the invitation 112 is being communicated to a contact 132 whose local time zone indicator indicates a local time zone that is three hours behind the local time zone of the user 142. Also assume that the event is scheduled for 2:00 P.M. in the user's local time zone. The invitation 112 thus can indicate to the contact 132 that the event is scheduled for 11:00 A.M. in the contact's local time zone.

The contact 132 can respond to the event invitation with the response 118, which can indicate whether the event invitation is denied or accepted for an indicated time, or can suggest an alternative time for the event. The event scheduler 130 can process the response accordingly. For example, if the response 118 indicates that the invitation 112 is accepted, the event scheduler 130 can add the contact 132 to a list of event participants and an invitation acceptance message can be presented to the user 142. If the response 118 indicates that the invitation 112 is denied, the event scheduler 130 can remove the contact 132 from a list of potential participants and an invitation denial message can be presented to the user 142. If the response 118 indicates a request to change the time of the event, the event scheduler 130 can present a time change request to the user 142 and other contacts 134, 136 invited to the event.

The event scheduler 130 also can generate one or more views that indicate to the user 142 a list of contacts 132-136 attending the event and the time of the event in the respective time zones. The communication devices 106-110 also can present such views to the contacts 132-136.

Figure 2:
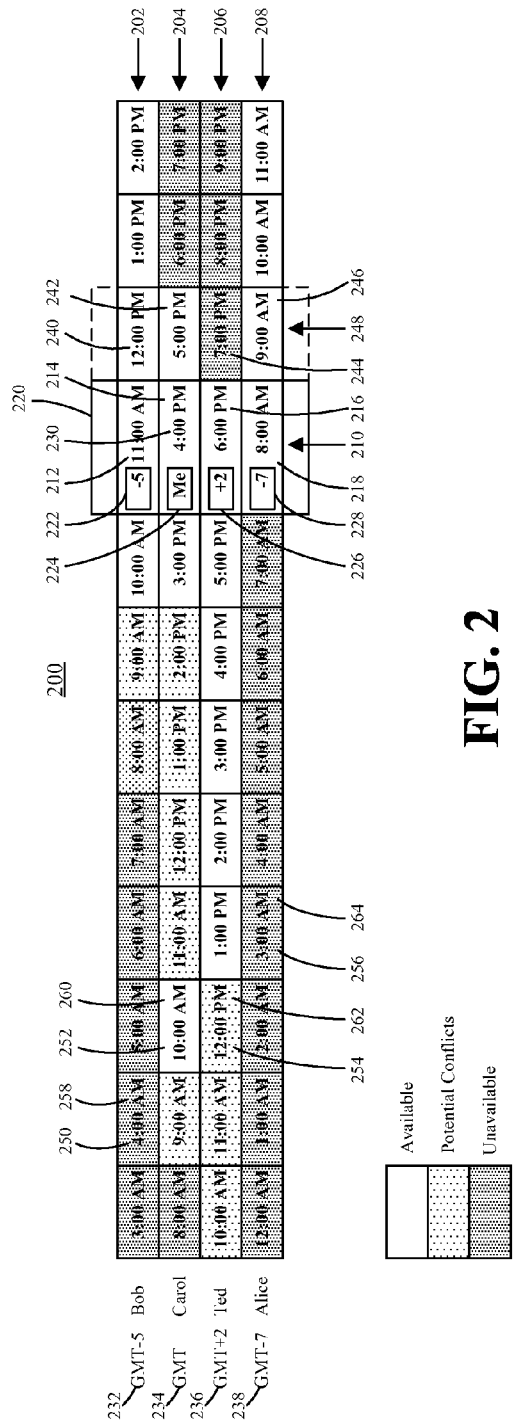
FIG. 2 is a view of a user interface displaying calendared events in accordance with an embodiment of the present invention.

FIG. 2 is a view 200 of a user interface displaying calendared events in accordance with an embodiment of the present invention. The view 200 can include a time table 202, 204, 206, 208 for each of the contacts invited to attend the event and the event coordinator (collectively referred to as "event participants"). The time tables 202-208 can be arranged in any suitable order, for example based on priority levels assigned to the participants, based on the time zones, and so on. Further, the time tables 202-208 can be displayed horizontally, as in the example, or vertically.

The time tables 202-208 can be rendered to provide a visual cue associating an event time 210 across each of the time tables 202-208. For example, the time tables 202-208 can be positioned such that time blocks 212, 214, 216, 218, in the respective time tables 202-208, that correspond to the event time 210 are displayed in juxtaposition to one another. In that regard, the time tables 202-208 can be shifted with respect to one another by an amount of time equal to their time zone differences. Further, each of the time blocks 212-218 can display an indicator that indicates a local time of the scheduled event for the respective participants.

Additional indicators also can be provided to accentuate the event time 210. For instance, the time blocks 212-218 can be presented with a particular font, color and/or effect. In another embodiment, the time blocks 212-218 can be displayed in a particular shade, color or hatching, or displayed in any other suitable manner. Additional indicators also can be provided. For instance, an association indicator 220 can be associated with the time blocks 212-218 that correspond to the event time 210. In one embodiment, the association indicator 220 can be a graphic, such as a box.

Further, for each of the time tables 202-208, a time difference indicator 222, 224, 226, 228 can be displayed to indicate a difference between a respective participant's local time for the event and an event time reference. The time difference indicators 222-228 can be juxtaposed with respect to one another. As with the time blocks 212-218, the association indicator 220 can visually associate the time difference indicators 222-228 with one another.

In one embodiment, the event time reference can be the scheduled time of the event in the time zone associated with the participant to whom the view 200 is being presented. In another embodiment, the event time reference can be the scheduled time of the event in the time zone associated with the event participant identified as the event coordinator. For example, if the view is being presented to Carol (or Carol is identified as the event coordinator), and Bob is in a time zone that is five hours behind Carol's time zone, the indicator 222 can display "−5". Similarly, if Ted is located in a time zone that is two hours ahead of Carol's time zone and Alice is located in a time zone that is seven hours behind Carol's time zone, the indicator 226 can display "+2" and the indicator 228 can display "−7". The indicator 224 can display any suitable message to indicate that the time 230 presented in the time table 204 is the local time of the event in Carol's time zone.

In addition to, or in lieu of, the indicators 222-228, indicators 232, 234, 236, 238 can be displayed to indicate the local time zones for the respective event participants. The indicators can, for example, identify each of the local time zones with respect to a particular time reference, such as GMT.

In one embodiment, the association indicator 220 can be moved in response to a user input (e.g. with a cursor, a stylus, an appendage, keystrokes, etc.) to select a new event time. For instance, the association indicator 220 can be moved to the time blocks 240, 242, 244, 246 to change the event time to the time 248. A size (e.g. width) of the association indicator 220 also can be increased or decreased in response to a user input to increase or decrease the duration of the event. For example, the association indicator 220 can be stretched to encompass the time blocks 212-218 and the time blocks 240-246, thereby allocating an amount of time for the event equal to the duration of the amount of time indicated by the time block 212 and the time block 240. The duration of each time block 212-218, 240-246 can be any suitable time period, for instance one or more minutes, one or more portions of an hour, one or more hours, one or more days, etc.

In response to the association indicator 220 being moved, increased or decreased, the user can be automatically prompted to choose whether to send invitation updates to event participants. If the user chooses to do so, such invitations can be automatically sent, and responses to the invitations can be processed, as previously described.

In another aspect of the inventive arrangements, one or more of the time blocks 250, 252, 254, 256 can be presented with availability indicators 258, 260, 262, 264 to indicate availability of the respective event participants. For instance, the availability indicators 258-264 can indicate times at which event participants are available or unavailable, or times when there may be potential conflicts. Availability indicators 258-264 also can indicate lunch times, scheduled breaks, non-working hours, or any other time periods. The availability indicators 258-264 can be displayed as a particular shade, color or hatching within the time blocks 250-256, or displayed in any other suitable manner.

Figure 3:
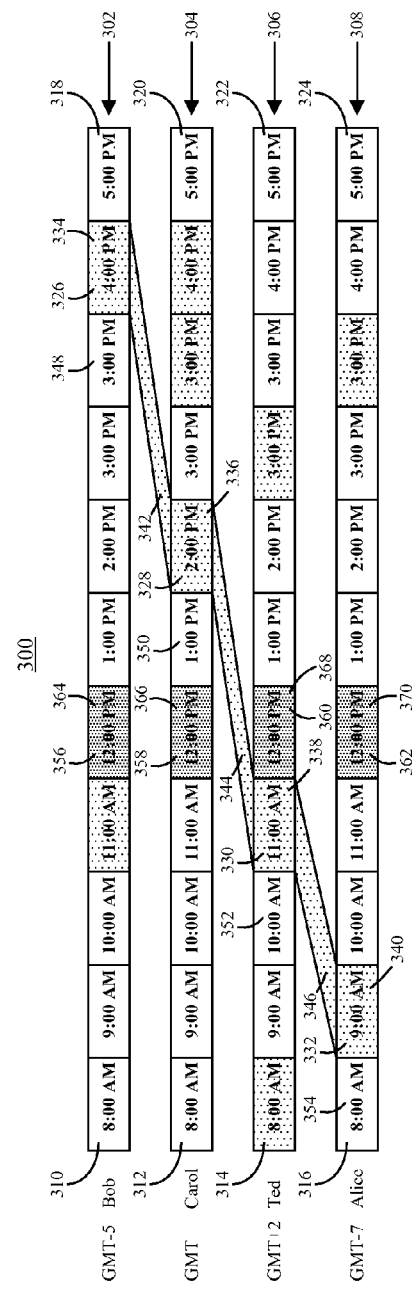
FIG. 3 is a view of a user interface displaying calendared events in accordance with another embodiment of the present invention.

FIG. 3 is a view 300 of a user interface displaying calendared events in accordance with another embodiment of the present invention. The view 300 can include a time table 302, 304, 306, 308 for each of the contacts invited to attend the event and the event coordinator (collectively referred to as "event participants"). The time tables 302-308 can be presented horizontally, as in the example, or vertically. Further, the time tables 302-308 can be displayed so as to display common start times 310, 312, 314, 316 in juxtaposition to one another, and to display common end times 318, 320, 322, 324 in juxtaposition to one another. Moreover, each of the time blocks 326, 328, 330, 332 can display an indicator that indicates a local time of the scheduled event for the respective participants.

The time tables 302-308 can be rendered to provide a visual cue associating an event time across each of the time tables 302-308. For example, assume that the event is scheduled for 4:00 P.M. in the time zone in which Bob is located, 2:00 P.M. in the time zone in which Carol is located, 11:00 A.M. in the time zone in which Ted is located and 9:00 A.M. in the time zone in which Alice is located. Accordingly, the time blocks 326-332 can be presented with a particular font, color and/or effect. The time blocks 326-332 also can be displayed with indicators 334, 336, 338, 340, such as a particular shade, color or hatching, or another indicator suitable for indicating that the time blocks 326-332 are associated with one another. In addition, one or more association indicators 342, 344, 346 linking the time blocks 326-332 can be displayed. Such association indicators 342-346 also can be displayed in a particular shade, color or hatching, or displayed in any other suitable manner.

In one embodiment, the selected event times can be changed in response to a user input. For instance, the user can select the indicators 334-340 or the association indicators 342-346 and drag the indicators 334-340 and/or association indicators 342-346 to select a new time. In that regard, such indicators 334-346 can be moved in unison. A size of the indicators 334-346 also can be increased or decreased in response to a user input to increase or decrease the duration of the event. For example, the indicators 334-340 can be stretched to encompass the time blocks 326, 348, the time blocks 328, 350, the time blocks 330, 352 and the time blocks 332, 354. In this manner an amount of time for the event can be changed to be equal to the duration of the amount of time indicated by the time block 326 and the time block 348. The duration of each time block 326-332, 348-354 can be any suitable duration of time, for instance one or more minutes, one or more portions of an hour, one or more hours, one or more days, etc.

In response to the indicators 334-346 being moved, increased or decreased, the user can be automatically prompted to choose whether to send invitation updates to event participants. If the user chooses to do so, such invitations can be automatically sent, and responses to the invitations can be processed, as previously described. Further, as noted, one or more of the time blocks 356, 358, 360, 362 can be presented with availability indicators 364, 366, 368, 370 to indicate availability of the respective event participants.

Figure 4:
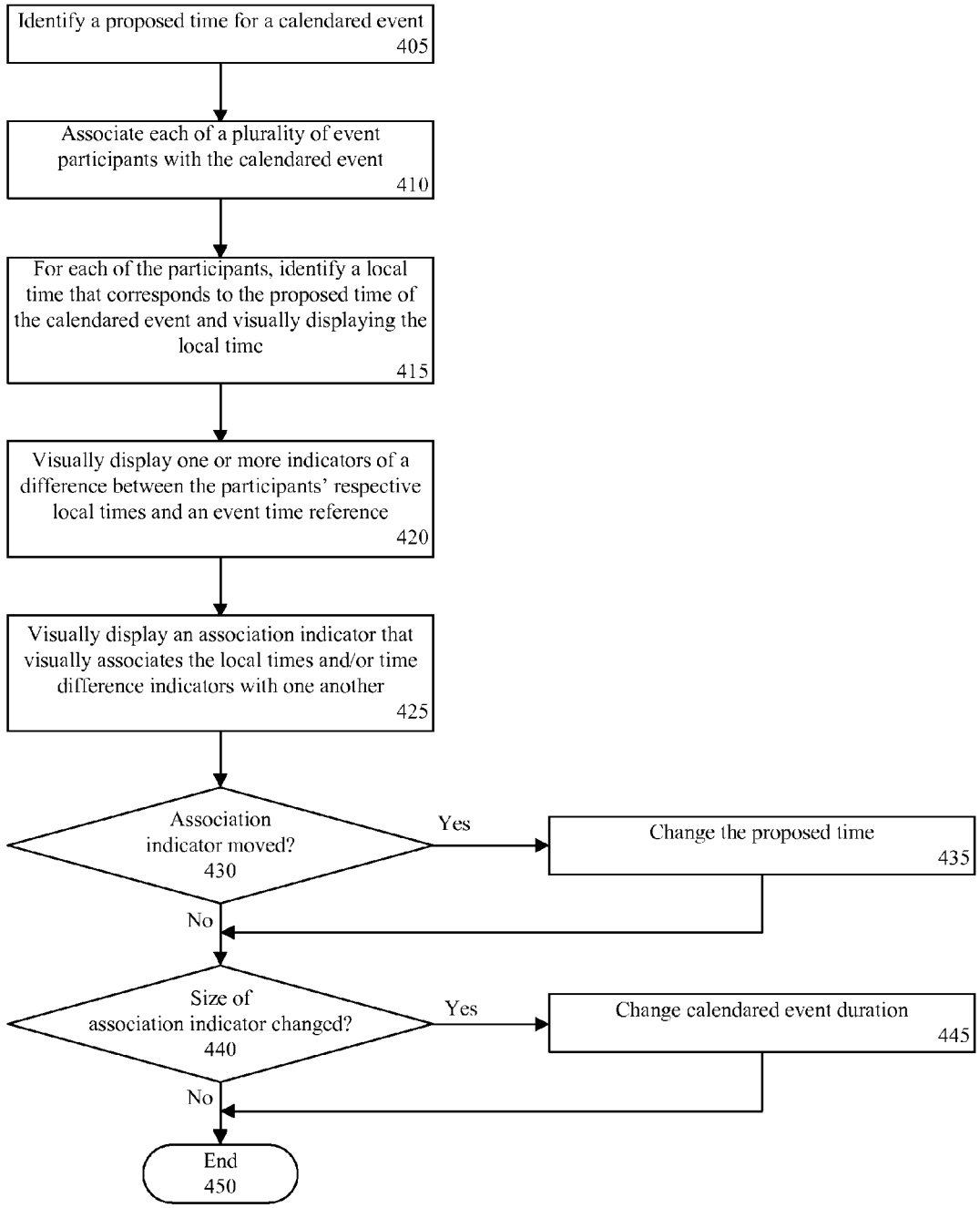
FIG. 4 is a flow chart illustrating a method of indicating a calendared event in accordance with another embodiment of the present invention.

FIG. 4 is a flow chart illustrating a method 400 of indicating a calendared event in accordance with another embodiment of the present invention. The method 400 can begin in a state in which a calendar event has been scheduled, invitations to the event have been communicated, and responses to the invitations have been received. At step 405 a proposed time for the calendared event can be identified. At step 410, each of a plurality of event participants can be associated with the calendared event. At step 415, for each of the participants, a local time that corresponds to the proposed time of the calendared event can be identified and displayed. Optionally, at step 420, one or more indicators of a difference between the participants' respective local times and the event time reference also can be displayed.

At step 425, an association indicator can be displayed. The association indicator can visually associate the local times with one another and/or visually associate the time difference indicators with one another. Referring to decision box 430, if the association indicator is moved, the process can proceed to step 435 and the proposed time can be changed in accordance with the movement of the association indicator. Referring to decision box 440, if the size of the association indicator is changed, at step 445 the duration of the calendared event can be changed. As noted, event invitations can be re-sent if the time and/or duration of the calendared event has changed. If at decision box 440 the size of the association indicator has not changed, at step 450 the process can end or continue (e.g. monitor for additional responses).

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method for visually indicating a calendared event, comprising:
    identifying a proposed time for the calendared event;
    associating each of a plurality of event participants with the calendared event;
    displaying a plurality of time tables, respectively for the participants;
    visually spacing each of the time tables from one another;
    for each of the participants, along either a shared horizontal or vertical axis, displaying a common local start time in juxtaposition to one another;
    for each of the participants, identifying a local time block that corresponds to the proposed time for the calendared event; and
    displaying, within spaces between the time tables, visual indicators linking the identified local time blocks.

2. The method of claim 1, further comprising:
    for a first of the participants, displaying a second indicator that indicates at least a first period in which the first participant is unavailable; and
    for a second of the participants, displaying a third indicator that indicates a second period in which the second participant is unavailable.

3. The method of claim 2, further comprising:
    receiving a user input to move one of the visual indicators linking the identified local time blocks; and
    responsive to the user input, changing the proposed time.

4. The method of claim 2, further comprising:
    receiving a user input to change a size of one of the visual indicators linking the identified local time blocks; and
    responsive to the user input, changing a duration of the calendared event.

5. The method of claim 1, further comprising:
    displaying first indicators, within the time tables, that visually identify the identified local time blocks.

6. A computer-implemented method for visually indicating a calendared event, comprising:
    displaying a plurality of time tables, respectively, for a plurality of event participants associated with the calendared event;
    displaying, associated with a time table for a first of the event participants, a first time difference indicator;
    displaying, associated with a time table for a second of the event participants, a second time difference indicator;
    displaying, associated with the first time difference indicator and the second time difference indicator, an association indicator; and
    for each of the event participants, identifying a local time block, of the event participant, that corresponds to a proposed time block for the calendared event, wherein
    the first time difference indicator indicates a time difference between the local time block of the first event participant and an event time reference,
    the second time difference indicator indicates a time difference between the local time block of the second event participant and the event time reference,
    the association indicator visually associates the first time difference indicator to the second time difference indicator, and
    the event time reference is a time of the calendared event in a time zone of a predetermined entity, wherein
    a size of the association indicator is variable, and
    varying the size of the association indicator changes a duration of the calendared event.

7. The method of claim 6, wherein
    the predetermined entity is an event coordinator.

8. The method of claim 6, wherein
    the predetermined entity is a user to which the plurality of time tables is being displayed.

9. The method of claim 6, wherein
    the association indicator is movable with respect to the plurality of time tables.

10. The method of claim 9, wherein
    movement of the association indicator changes the proposed time block for the calendared event.

11. The method of claim 6, further comprising
    displaying, associated with one of the event participants, an availability indicator.

12. A computer program product comprising a computer-usable storage medium having stored therein computer-usable program code for visually indicating a calendared event, the computer-usable program code, which when executed by a computer hardware system, causes the computer hardware system to perform:
    displaying a plurality of time tables, respectively, for a plurality of event participants associated with the calendared event;
    displaying, associated with a time table for a first of the event participants, a first time difference indicator;
    displaying, associated with a time table for a second of the event participants, a second time difference indicator;
    displaying, associated with the first time difference indicator and the second time difference indicator, an association indicator; and
    for each of the event participants, identifying a local time block, of the event participant, that corresponds to a proposed time block for the calendared event, wherein
    the first time difference indicator indicates a time difference between the local time block of the first event participant and an event time reference,
    the second time difference indicator indicates a time difference between the local time block of the second event participant and the event time reference, the association indicator visually associates the first time difference indicator to the second time difference indicator, and the event time reference is a time of the calendared event in a time zone of a predetermined entity, wherein a size of the association indicator is variable, and varying the size of the association indicator changes a duration of the calendared event.

13. The computer program product of claim 12, wherein the predetermined entity is an event coordinator.

14. The computer program product of claim 12, wherein the predetermined entity is a user to which the plurality of time tables is being displayed.

15. The computer program product of claim 12, wherein the association indicator is movable with respect to the plurality of time tables.

16. The computer program product of claim 15, wherein movement of the association indicator changes the proposed time block for the calendared event.

17. The computer program product of claim 12, wherein the computer-usable program code further causes the computer hardware system to perform displaying, associated with one of the event participants, an availability indicator.

* * * * *